Feb. 6, 1968     G. M. GORTAN     3,367,451

DISC BRAKE MECHANISM

Filed Feb. 1, 1966     2 Sheets-Sheet 1

Feb. 6, 1968    G. M. GORTAN    3,367,451
DISC BRAKE MECHANISM
Filed Feb. 1, 1966    2 Sheets-Sheet 2

United States Patent Office 3,367,451
Patented Feb. 6, 1968

3,367,451
DISC BRAKE MECHANISM
Guido Mauro Gortan, Bettembourg, Luxembourg, assignor to Secalt S.A., Luxembourg-Pulvermuh, Luxembourg
Filed Feb. 1, 1966, Ser. No. 523,979
Claims priority, application Luxembourg, Feb. 1, 1965, 47,887
6 Claims. (Cl. 188—72)

ABSTRACT OF THE DISCLOSURE

A brake mechanism in which a rotatable ring on a rod is acted on by a pedal to cause relative sliding movement of two braking heads towards one another to urge respective annular friction elements against associated surfaces of wheels which are mounted on axles supported on the rod, the sliding movement being achieved by projecting pins on opposite surfaces of the ring, acting respectively on a first braking head and a disc mounted on the rod and bent about a diameter thereof, the other braking head being secured to the rod by a transverse pin.

The present invention relates to a foot brake which can be used for any hand truck mounted on wheels and adapted for the transportation of goods, apparatus or persons. The foot brake can operate
 (a) One or more wheels, or
 (b) One or more sets of wheels on which it works simultaneously.

Certain brakes known at the present time are applied against the tread of the tire of each wheel either directly or through a metal stud, but they have the following disadvantages:
 (1) They yield a limited braking force because of the small coefficient of friction between steel and rubber;
 (2) They give rise to an additional, non-negligible wear of the tyre tread;
 (3) They operate individually on each wheel whereby:
  (a) They can yield a different braking force on the wheels of each set,
  (b) They require two applications of the brake for each set of wheels.

These disadvantages are overcome by the brake according to the invention, which has the following objectives:
 (1′) To provide a substantial frictional force between the surface to be braked and the active surface of the brake mechanism which makes contact therewith,
 (2′) To eliminate additional wear of the tire tread, by developing the braking friction between a braking element and the wheel;
 (3′a) To operate simultaneously on the wheels of a set and develop an equal braking force on each wheel;
 (3′b) To operate in consequence of a single brake application for each set of wheels.

According to the invention there is provided a brake mechanism in which a rotatable ring is mounted on a rod and is acted on by a pedal to cause relative sliding movement of two braking heads towards one another to urge respective annular friction elements against associated surfaces of a wheel mounted on an axle supported on the rod. The sliding movement is achieved by the provision of projecting pins on opposite surfaces of the ring acting respectively on a first braking head and a disc mounted on the rod for displacement therewith and bent about a diameter thereof, the other braking head being secured to the rod by a transverse pin.

Figure 1:
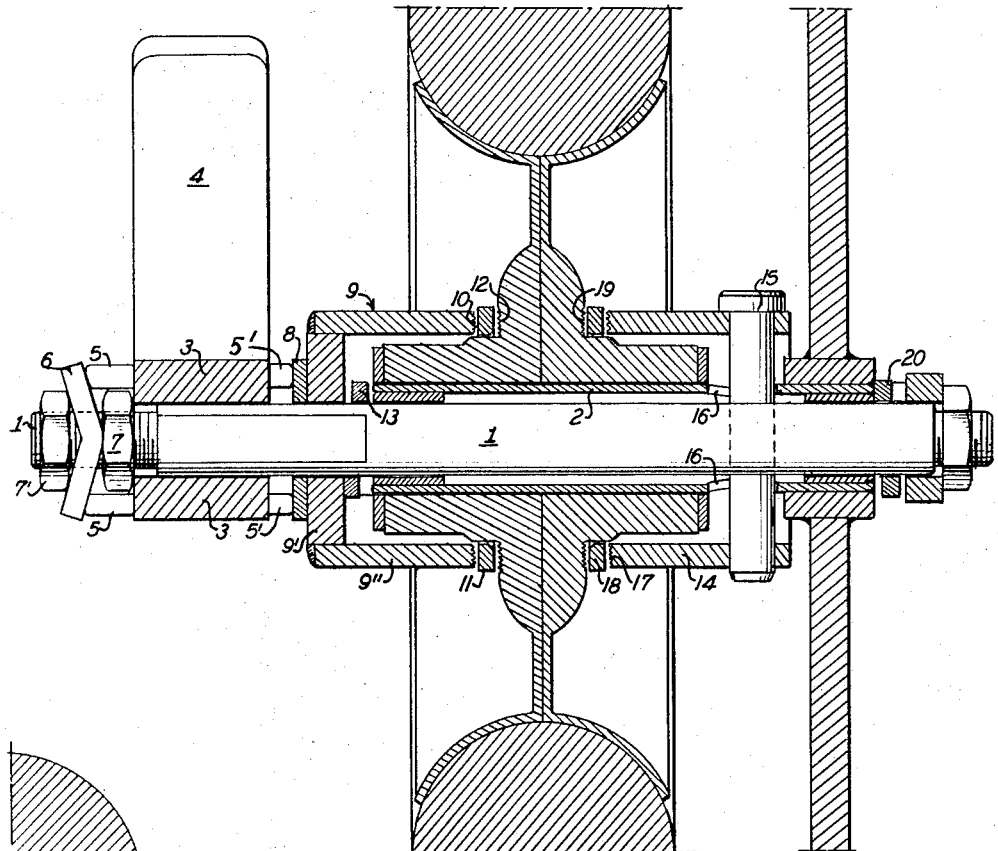
Figure 3B:
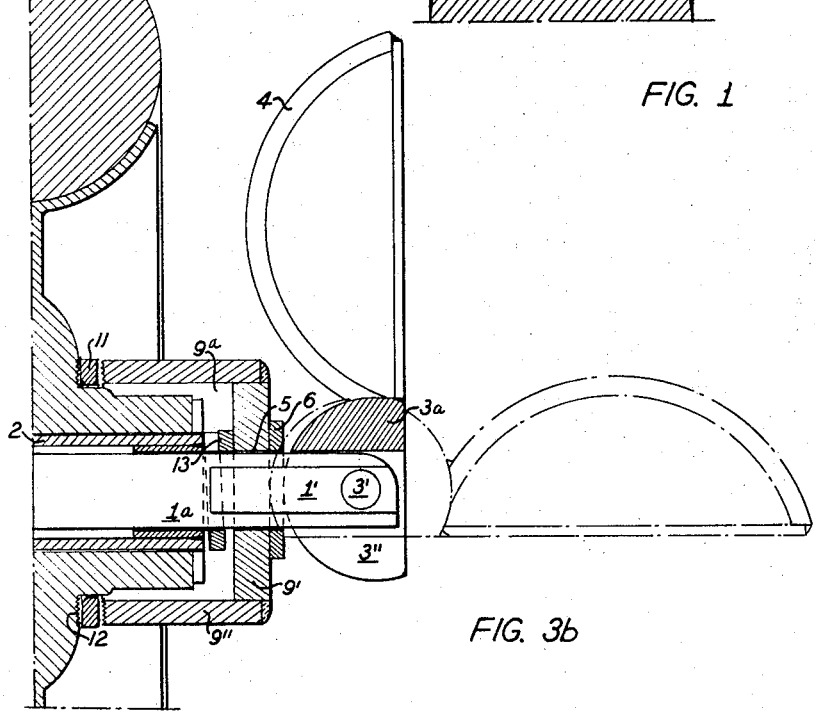
Figure 2:
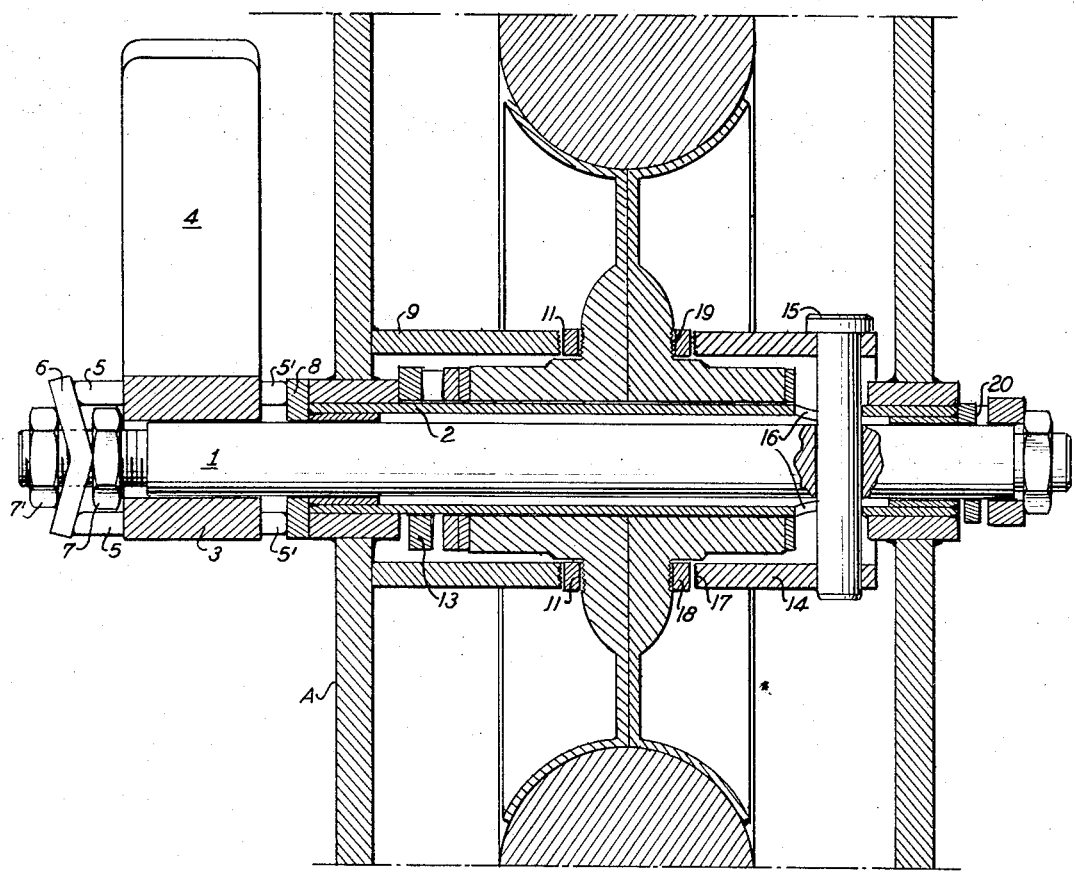
Figure 3A:
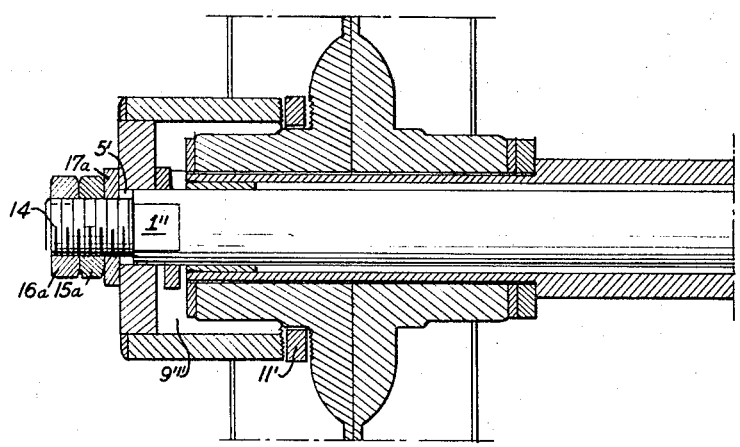

The invention will next be described in greater detail with reference to the attached drawing wherein:

FIGURE 1 is a longitudinal sectional view of a brake mechanism according to the invention as applied to an overhanging axle supported on one side of a wheel, FIGURE 2 is a longitudinal sectional view similar to FIG. 1, but of a modified brake mechanism as applied to an axle supported on both sides of a wheel, FIGURES 3a and 3b show a brake mechanism in section for a set of wheels, FIG. 3a showing the mechanism to the left of the wheels and FIG. 3b to the right of the wheels.

The brake mechanism in FIG. 1 comprises a rod 1 constituted for example of a cylindrical steel member passing through an axle 2.

A ring 3 is rotatably mounted on rod 1 and is secured with an actuating pedal 4. The ring 3 has four pin projections 5, 5′ on opposite sides thereof. The pins 5 are in contact with a disc 6 which is bent along a diameter thereof and clamped between two nuts, 7, 7′ which are threaded on rod 1. The nuts 7, 7′ maintain the disc in a fixable and adjustable longitudinal position on the rod 1.

The pins 5′ bear against a washed 8, which rests on a braking head 9 composed of a disc 9′ and a cylindrical member 9″ welded to the disc 9′. The member 9″ has a free circular edge 10 which is knurled.

The braking head 9 can be pushed by the ring 3 against an annular braking element 11 of friction material. The element 11 in turn contacts a knurled surface 12 of the wheel to effect a braking action thereon. Normally, the head 9 is kept away from the said braking element 11 by a spring washer 13.

The other end of the rod 1 is coupled to a cylindrical braking head 14 by a transverse pin 15 passing through two longitudinal slots 16 situated in the axle 2.

The braking head 14 has a knurled surface 17 which can be pushed against a braking element 18, similar to the braking element 11, to urge the element 18 into contact with a knurled surface 19 of the wheel. Normally, the head 14 is kept away from the said braking element 18 by a spring washer 20.

The brake for a wheel in which the axle is supported on both sides of the wheel, can be composed, for instance, as shown in FIG. 2. Therein elements 1–8 are the same as described hereinbefore in connection with FIG. 1. These elements are supported on a support A of the wheel.

Tubular element 9 is welded to support A and the braking element 11 is urged thereagainst by the wheel under the action of head 14 and element 18. Normally, the element 9 is kept away from element 11 by spring washer 13.

The other end of the rod is connected with elements 14–20 in the same manner as described above with reference to the overhanging axle of FIG. 1.

A brake mechanism for a set of wheels is shown in FIGS. 3a and 3b, wherein rod 1a passes through axle 2, the rod 1a having a flat end 1′ on which a cam 3a is pivotally mounted on an axle 3′, the cam 3a having a slot 3″ receiving the flat part 1′ of the rod 1a.

The cam is welded to actuating pedal 4 and the cam can drive, directly or through a washer 6′, braking head 9a composed of a disc 9′ and cylindrical part 9″ welded to disc 9′.

The disc 9′ has a rectangular opening 5 in which the flat end of the rod 1 is slidably received.

The cylindrical part 9″ has the free edge thereof knurled.

The braking head 9a can be pushed by the cam 3a against a braking element 11 to urge the latter into contact with knurled surface 12 of the wheel.

The other end of the rod 1a also has a flat part 1″ which is slidable in a rectangular opening 5′ in a braking head 9‴, facing braking element 11′. The rod 1a is provided with a threaded part 14 on which are screwed a nut 15a and a lock nut 16a and also a washer 17a.

In order to effect a braking operation, the pedal 4 is depressed until either a sufficient braking action is obtained or else, if necessary, the wheel or the set of wheels has completely locked, which takes place when the pedal 4 and the ring 3 or the cam 3a have turned through a quarter of a revolution.

In case the braking action has to remain approximately constant (e.g., for descending a certain grade), it is possible to maintain the cam 3a in any intermediate position by a spring ball (not shown in the drawing) placed in the flat part 1' and which can enter in one of several recesses in one of the two vertical surfaces of the slot of the cam. Alternatively, a spring washer can be mounted on the rod 1a to generate a friction capable of maintaining the cam and the pedal in any intermediate position.

There has been given a description of several embodiments of the invention, but it is well understood that this does not prejudice in any way the possibility to obtain the same result by means of different elements in accordance with the same principles of the invention.

What I claim is:

1. A brake mechanism comprising a rod, an axle on said rod rotatably supporting at least one wheel, a rotatable ring on said rod, a plurality of projections extending from said ring at opposite sides thereof parallel to the rod, a fixed disc on said rod adjacent the ring for engaging the pins projecting from the side facing the disc, said disc being bent along a diameter thereof so that as the ring is rotated on the rod, relative axial movement is effected between the rod and ring, first and second braking heads mounted on the rod at opposite ends thereof, the first braking head being adjacent the ring on a side thereof opposite the disc and in engagement with the pins facing the braking head, means connecting the second braking head with the rod for displacement therewith, an annular friction element for each braking head positioned adjacent the respective head and an associated surface of a wheel which it frictionally engages when acted on by the respective head, and elastic means acting on each of the heads to urge the same out of contact with the associated friction element.

2. A mechanism as claimed in claim 1 comprising means on the rod engaging the disc to adjust the fixed position of the disc on the rod.

3. A mechanism as claimed in claim 1, wherein said first braking head comprises a disc mounted on the rod and a cylindrical member secured to the disc and having a free knurled edge facing the associated annular friction element.

4. A mechanism as claimed in claim 1, wherein said means connecting the second braking head with the rod comprises a transverse pin on said rod engaging said second head, said axle having a slot in which the pin is slidably received.

5. A mechanism as claimed in claim 1 comprising a single wheel support on the rod at the end thereof proximate the second head, the remainder of the rod overhanging said support.

6. A mechanism as claimed in claim 1 comprising a pair of spaced wheel supports on the rod, one being positioned proximate the second head, the other being proximate the ring and secured to the first head.

References Cited

UNITED STATES PATENTS

| 1,443,093 | 1/1923 | Sanderson | 188—71 |
| 1,843,490 | 2/1932 | Spase | 188—72 |
| 1,928,866 | 10/1933 | Newhart | 188—72 |

FOREIGN PATENTS

| 1,201,928 | 7/1959 | France. |

MILTON BUCHLER, *Primary Examiner.*

G. E. HALVOSA, *Assistant Examiner.*